(12) United States Patent
Mao et al.

(10) Patent No.: US 11,514,934 B1
(45) Date of Patent: Nov. 29, 2022

(54) PLANAR DESIGN FOR SENSORS IN A DUAL FREE LAYER READ HEAD

(71) Applicant: Western Digital Technologies, Inc., San Jose, CA (US)

(72) Inventors: Ming Mao, Dublin, CA (US); Chen-Jung Chien, Mountain View, CA (US); Daniele Mauri, San Jose, CA (US); Goncalo Marcos Baião De Albuquerque, San Jose, CA (US); Chih-Ching Hu, Pleasanton, CA (US); Anup Ghosh Roy, Fremont, CA (US); Yung-Hung Wang, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/512,216

(22) Filed: Oct. 27, 2021

(51) Int. Cl.
*G11B 5/39* (2006.01)
*G11B 5/11* (2006.01)

(52) U.S. Cl.
CPC ............ *G11B 5/3932* (2013.01); *G11B 5/11* (2013.01); *G11B 5/3912* (2013.01); *G11B 5/3954* (2013.01); *G11B 5/399* (2013.01); *G11B 2005/3996* (2013.01)

(58) Field of Classification Search
None
See application file for complete search history.

(56) References Cited

U.S. PATENT DOCUMENTS

| | | |
|---|---|---|
| 3,711,517 A | 1/1973 | Siddall et al. |
| 8,824,106 B1 | 9/2014 | Garfunkel et al. |
| 9,042,059 B1 | 5/2015 | Katine et al. |
| 9,324,342 B2 | 4/2016 | Sapozhnikov et al. |
| 9,396,744 B1 | 7/2016 | Yamashita et al. |
| 9,401,163 B2 | 7/2016 | McKinlay et al. |
| 9,570,100 B1 | 2/2017 | Freitag et al. |
| 10,777,222 B1 | 9/2020 | Liu et al. |
| 11,087,785 B1 | 8/2021 | Mao et al. |

(Continued)

OTHER PUBLICATIONS

Lippman, Thomas et al., "Spinstand demonstration of areal density enhancement using two-dimensional magnetic recording (invited)", Journal of Applied Physics, AIP Publishing, vol. 117, Issue 17, 2015, http://dx.doi.org/10.1063/1.4914051.

(Continued)

*Primary Examiner* — Craig A. Renner
(74) *Attorney, Agent, or Firm* — Patterson & Sheridan, LLP; Steven H. VerSteeg

(57) ABSTRACT

The present disclosure generally relates to a dual free layer (DFL) two dimensional magnetic recording (TDMR) read head. The read head comprises a first sensor, a first rear hard bias (RHB) structure disposed adjacent to the first sensor, an upper shield disposed over the first sensor and first RHB structure, a lower shield disposed over the upper shield, a second sensor disposed over the lower shield, and a second RHB structure disposed adjacent to the second sensor. A first surface of the first sensor is substantially flush or aligned with a first surface of the first RHB structure. A first surface of the second sensor is substantially flush or aligned with a first surface of the second RHB structure. The upper shield extends linearly from a media facing surface into the read head. The first lower shield is over-milled a greater amount of time than the second lower shield.

22 Claims, 5 Drawing Sheets

(56) References Cited

U.S. PATENT DOCUMENTS

| | | |
|---|---|---|
| 2015/0243302 A1 | 8/2015 | Kief et al. |
| 2016/0055868 A1* | 2/2016 | Gao et al. ............ G11B 5/3932 360/319 |
| 2017/0084296 A1 | 3/2017 | Garfunkel et al. |
| 2017/0337941 A1 | 11/2017 | Xiao et al. |
| 2020/0176024 A1 | 6/2020 | Quan et al. |

OTHER PUBLICATIONS

International Search Report and Written Opinion for International Application No. PCT/US2022/029339 dated Oct. 7, 2022.

* cited by examiner

PLANAR DESIGN FOR SENSORS IN A DUAL FREE LAYER READ HEAD

BACKGROUND OF THE DISCLOSURE

Field of the Disclosure

Embodiments of the present disclosure generally relate to a dual free layer (DFL) two dimensional magnetic recording (TDMR) read head.

Description of the Related Art

Two dimensional magnetic recording (TDMR) read heads generally have a first sensor, oftentimes referred to as a lower reader and a second sensor, oftentimes referred to as an upper reader. The readers each have lower and upper shields with an insulating reader separation gap (RSG) therebetween. Both the top reader and the bottom reader are substantially identical, each comprising two free layers to be dual free layer (DFL) readers or sensors. In DFL reader operation, the two free layers or each reader are individually stabilized longitudinally by an anti-ferromagnetically coupled (AFC) soft bias (SB) and biased transversally by a permanent magnet or a rear hard bias (RHB) structure from the stripe back edge of the sensor.

A transverse bias field of TDMR read heads is determined by the remnant magnetization (Mr) times thickness (t) product (i.e., Mr*t) of the RHB structure. Since a saturation magnetization, Ms, and thus, the Mr of the RHB is quite limited (e.g., as compared to the Ms of the soft bias), a thicker RHB is generally required to achieve the desired transverse bias field. The thicker RHB needed results in an increased topography along the reader stripe height (SH) direction. The large topography poses a challenge to TDMR DFL reader designs, as the large topography limits the read head's capacity in down track spacing (DTS), somewhat offsetting the intrinsic narrow shield-shield (S-S) advantage of DFL readers. A wide DTS can cause the two readers to become misaligned at large skew, thereby limiting the fraction of the disk accessible in TDMR mode. As such, the lower reader and the upper reader may perform asymmetrically with different performance and reliability.

Therefore, there is a need in the art for an improved TDMR read head.

SUMMARY OF THE DISCLOSURE

The present disclosure generally relates to a dual free layer (DFL) two dimensional magnetic recording (TDMR) read head. The read head comprises a first sensor, a first rear hard bias (RHB) structure disposed adjacent to the first sensor, an upper shield disposed over the first sensor and first RHB structure, a lower shield disposed over the upper shield, a second sensor disposed over the lower shield, and a second RHB structure disposed adjacent to the second sensor. A first surface of the first sensor is substantially flush or aligned with a first surface of the first RHB structure. A first surface of the second sensor is substantially flush or aligned with a first surface of the second RHB structure. The upper shield extends linearly from a media facing surface into the read head. The first RHB structure is positioned by over-milling for a greater amount of time into the first lower shield than the second RHB structure.

In one embodiment, a read head comprises a first lower shield, a first upper shield over the first lower shield, a first sensor disposed at a media facing surface (MFS) between the first lower shield and the first upper shield, the first sensor comprising a first surface disposed adjacent to the first upper shield, a first rear hard bias (RHB) structure disposed adjacent to the first sensor between the first lower shield and the first upper shield, the first RHB structure being recessed from the MFS, wherein a first surface of the first RHB structure is substantially aligned with the first surface of the first sensor, a second lower shield disposed over the first upper shield, a second sensor disposed at the MFS between the second lower shield and the second upper shield, the second sensor comprising a first surface disposed adjacent to the second lower shield, and a second RHB structure disposed adjacent to the second sensor adjacent to the second lower shield, the second RHB structure being recessed from the MFS, wherein a first surface of the second RHB structure is substantially aligned with the first surface of the second sensor.

In another embodiment, a read head comprises a first lower shield, a first sensor disposed at a media facing surface (MFS) on the first lower shield, a first rear hard bias (RHB) structure disposed adjacent to the first sensor, the first RHB structure being recessed from the MFS, a first upper shield over the first sensor and the first RHB structure, the first upper shield extending substantially linearly from the MFS into the read head, a read separation gap disposed over the first upper shield, the read separation gap extending substantially linearly from the MFS into the read head, a second lower shield disposed over the read separation gap, a second sensor disposed at the MFS on the first lower shield, a second RHB structure disposed adjacent to the second sensor, the second RHB structure being recessed from the MFS, and a second upper shield over the second sensor and the second RHB structure.

In yet another embodiment, a read head comprises a first lower shield, a first upper shield over the first lower shield, a first dual free layer (DFL) sensor disposed at a media facing surface (MFS) between the first lower shield and the first upper shield, the first sensor comprising a first surface disposed adjacent to the first upper shield, a first rear hard bias (RHB) structure disposed adjacent to the first sensor between the first lower shield and the first upper shield, the first RHB structure being recessed from the MFS, wherein a first surface of the first RHB structure is substantially aligned with the first surface of the first sensor, a read separation gap disposed over the first upper shield, the read separation gap extending substantially linearly from the MFS into the read head, a second lower shield disposed over the read separation gap, a second DFL sensor disposed at the MFS on the first lower shield, and a second RHB structure disposed adjacent to the second sensor, the second RHB structure being recessed from the MFS, wherein a down-track spacing between the first sensor and the second sensor is about 80 nm.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the Figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a dual free layer (DFL) two dimensional magnetic recording (TDMR) read head. The read head comprises a first sensor, a first rear hard bias (RHB) structure disposed adjacent to the first sensor, an upper shield disposed over the first sensor and first RHB structure, a lower shield disposed over the upper shield, a second sensor disposed over the lower shield, and a second RHB structure disposed adjacent to the second sensor. A first surface of the first sensor is substantially flush or aligned with a first surface of the first RHB structure. A first surface of the second sensor is substantially flush or aligned with a first surface of the second RHB structure. The upper shield extends linearly from a media facing surface into the read head. The first RHB structure is positioned by over-milling for a greater amount of time into the first lower shield than the second RHB structure.

Figure 1:
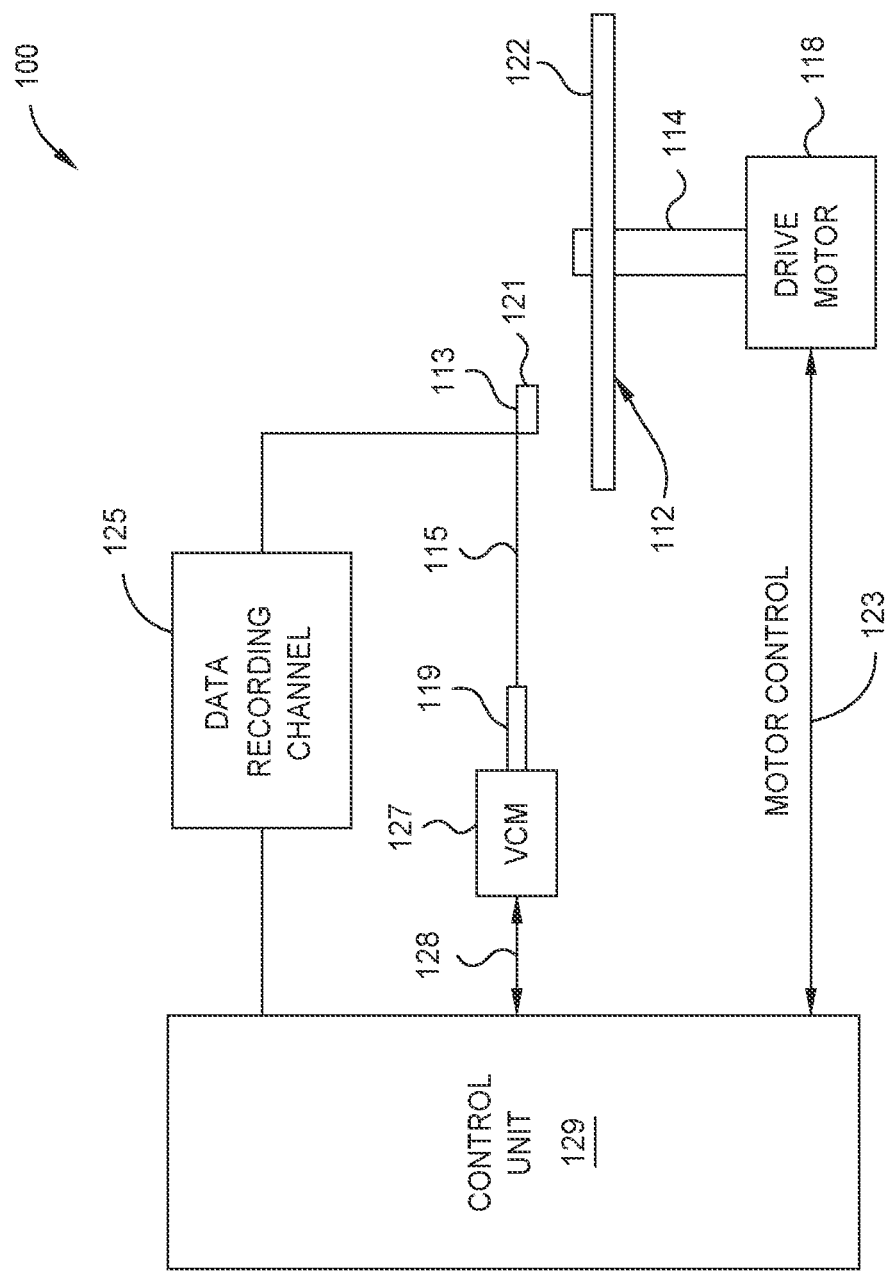
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

It is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in co-pending patent application titled "Tape Embedded Drive," U.S. application Ser. No. 16/365,034, filed Mar. 31, 2019, assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
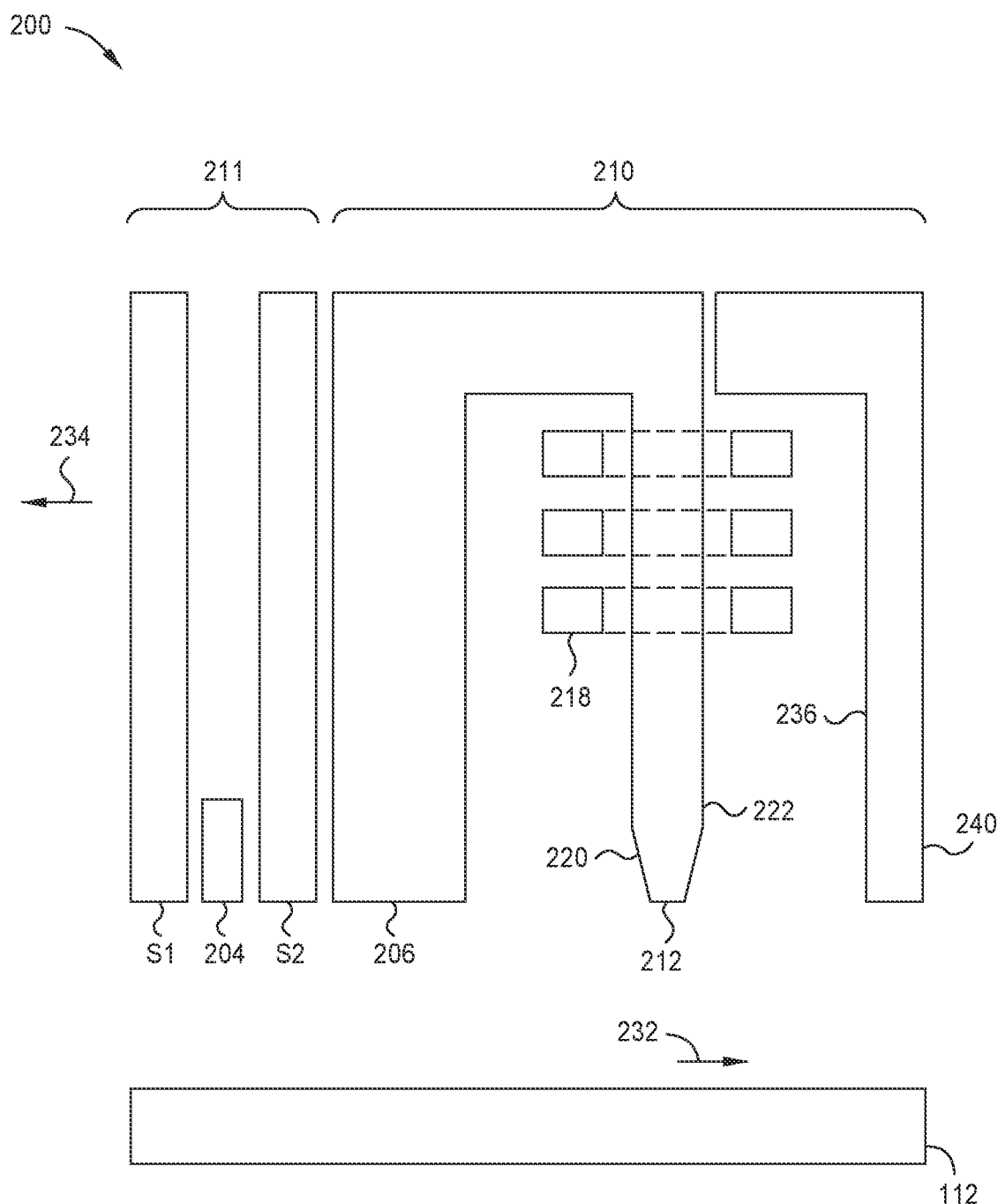
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head or a perpendicular magnetic recording (PMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a SOT differential reader 204 located between the shields S1 and S2. In other embodiments, the magnetic read head 211 is a magnetoresistive (MR) read head that includes an MR sensing element 204 located between MR shields S1 and S2. In some other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe, and Ni. The trailing shield 240 may be a magnetic material such as NiFe alloy. In one embodiment, the trailing shield 240 has an Ms of about 1.2 T to about 1.6 T.

Figures 3A, 3B:
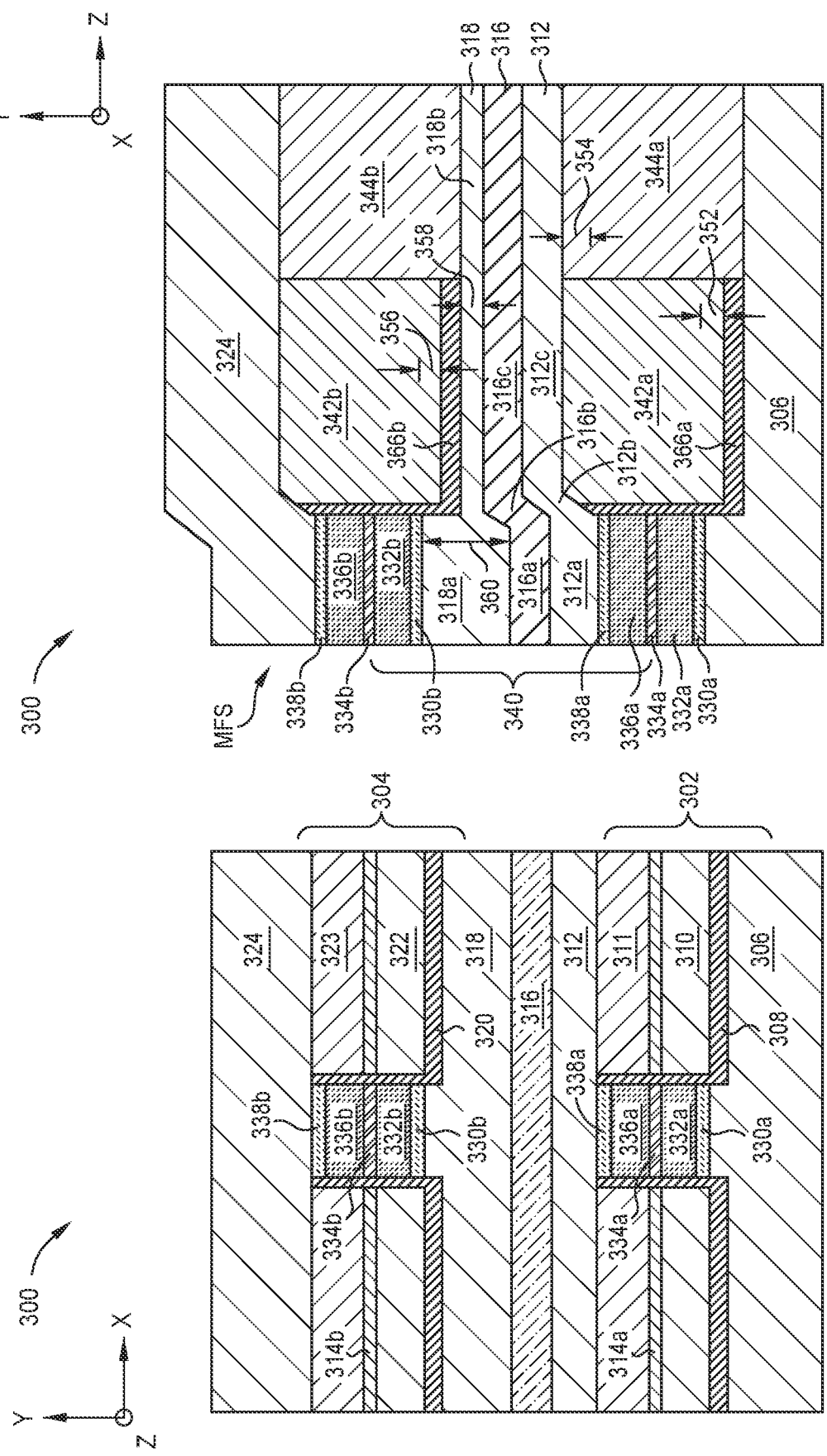
FIGS. 3A-3B illustrate various views of a conventional dual free layer (DFL) read head comprising two sensors or readers, according to one embodiment.

FIGS. 3A-3B illustrate various views of a conventional dual free layer (DFL) two dimensional magnetic recording (TDMR) read head 300 comprising two sensors or readers 302, 304, according to one embodiment. FIG. 3A illustrates a media facing surface (MFS) view of the DFL TDMR read head 300, and FIG. 3B illustrates a cross-sectional view of the DFL TDMR read head 300.

The DFL TDMR read head 300 comprises a first lower shield 306, a first insulation layer 308 disposed on the first shield 306, a first sensor or reader 302 disposed on the first lower shield 306 between portions of the first insulation layer 308, a first upper shield 312 disposed over the first sensor 302, a read separation gap (RSG) 316 disposed on the first upper shield 312, a second lower shield 318 disposed on the RSG 316, a second insulation layer 320 disposed on the second lower shield 318, a second sensor or reader 304 disposed on the second lower shield 318 between portions of the second insulation layer 320, and a second upper shield 324 disposed over the second sensor 304. The RSG 316 may comprise AlOx, where x is an integer greater than or equal to 1. The first and second sensors 302, 304 may each individually be tunnel magnetoresistance (TMR) sensors or magnetic tunnel junction (MTJ) sensors. The first and second sensors 302, 304 may be interchangeably referred to as a first reader 302 and a second reader 304 throughout.

The first reader 302 comprises a seed layer 330a, a first free layer 332a disposed on the seed layer 330a, a barrier layer 334a disposed on the first free layer 332a, a second free layer 336a disposed on the barrier layer 334a, and a cap layer 338a disposed on the second free layer 336a. The second reader 304 comprises a seed layer 330b, a first free layer 332b disposed on the seed layer 330b, a barrier layer 334b disposed on the first free layer 332b, a second free layer 336b disposed on the barrier layer 334b, and a cap layer 338b disposed on the second free layer 336b.

A first soft bias layer 310 is disposed on the first insulation layer 308 for the first reader 302 and an anti-ferromagnetically coupled (AFC) layer 314a is disposed between the first soft bias layer 310 and a second soft bias layer 311. Similarly, a first soft bias layer 322 is disposed on the first insulation layer 320 for the second reader and an AFC layer 314b is disposed between the first soft bias layer 322 and a second soft bias layer 323. The first upper shield 312 and the second upper shield 324 may each individually comprise a magnetic material similar to the soft bias material, such as NiFe, NiFe/CoFe laminates, NiFe/NiFeCr laminates, or NiFe/W laminates, for example. The first upper shield 312 and the second upper shield 324 may also each individually comprise a magnetic material similar to the soft bias material exchange biased by an antiferromagnet, such as IrMn, IrCrMn. The first upper shield 312 and the second upper shield 324 connect seamlessly to the second soft bias layers 311, 323. The first insulation layer 308 extends in the y-direction on each side of the first sensor 302 to prevent the first sensor 302 from contacting the first soft bias layer 310, the AFC layer 314a, and the second soft bias layer 311. Similarly, the first insulation layer 320 extends in the y-direction on each side of the second sensor 304 to prevent the second sensor 304 from contacting the second soft bias layer 322, and the AFC layer 314b, and the second soft bias layer 323. The AFC layers 314a and 314b comprise a CoFe/Ru/CoFe tri-layer.

As shown in FIG. 3B, a down-track spacing (DTS) 340 between the first barrier layer 334a of the first sensor 302 and the second barrier layer 334b of the second sensor 304 is about 90 nm to about 95 nm. A first rear hard bias (RHB) structure 342a is disposed behind the first reader 302, recessed from the MFS in the z-direction. A second insulation layer 366a is disposed between the first RHB structure 342a and the first reader 302, and between the first RHB structure 342a and the first lower shield 306. A third insulation layer 344a is disposed behind the first RHB structure 342a. The first RHB structure 342a and the second insulation layer 366a extend above the first sensor 302 a distance 354 in the y-direction of about 10 nm to about 15 nm. The first RHB structure 342a and the second insulation layer 366a extend below the first sensor 302 a distance 352 in the −y-direction of about 5 nm to about 10 nm. The first, second, and third, insulation layers 308, 366a, and 344a may each individually comprise MgO, AlOx, SiNx, SiOx and their laminates, where x is an integer greater than or equal to 1.

A second RHB structure 342b is disposed behind the second reader 304, recessed from the MFS in the z-direction. A second insulation layer 366b is disposed between the second RHB structure 342b and the second reader 304, and between the second RHB structure 342b and the second lower shield 318. The third insulation layer 344b is disposed behind the first RHB structure 342b. The second RHB structure 342b extends below the second sensor 304 a distance 356 in the −y-direction of about 5 nm to about 10 nm. The first RHB structure 342a and the second insulation layer 366a extending above the first sensor 302 the distance 354, and the second RHB structure 342b extending below the second sensor 304 the distance 356, causes the DTS between the sensors 302, 304 to widen in the y-direction.

Because the first RHB structure 342a and the second insulation layer 366a extend above the first sensor 302 the distance 354, neither the RSG 316 nor the first upper shield 312 is linear in the z-direction. As a result, the RSG 316 comprises a first portion 316a disposed at the MFS extending in the z-direction, a second portion 316b extending in the yz-direction, and a third portion 316c extending in the z-direction that is unaligned with the first portion 316a in the y-direction. Similarly, the first upper shield 312 comprises a first portion 312a disposed at the MFS extending in the z-direction, a second portion 312b extending in the yz-direction, and a third portion 312c extending in the z-direction that is unaligned with the first portion 312a in the y-direction. Additionally, the second lower shield 318 varies in thickness in the y-direction. A first portion 318a of the second lower shield 318 aligned with the second sensor 304 in the y-direction has a first thickness 360 of about 30 nm to about 35 nm greater than a second thickness 358 of about 10 nm to about 15 nm of a second portion 318b of the second lower shield 318 disposed between the RSG 316 and the second insulation layer 366b.

Figures 4A, 4B:
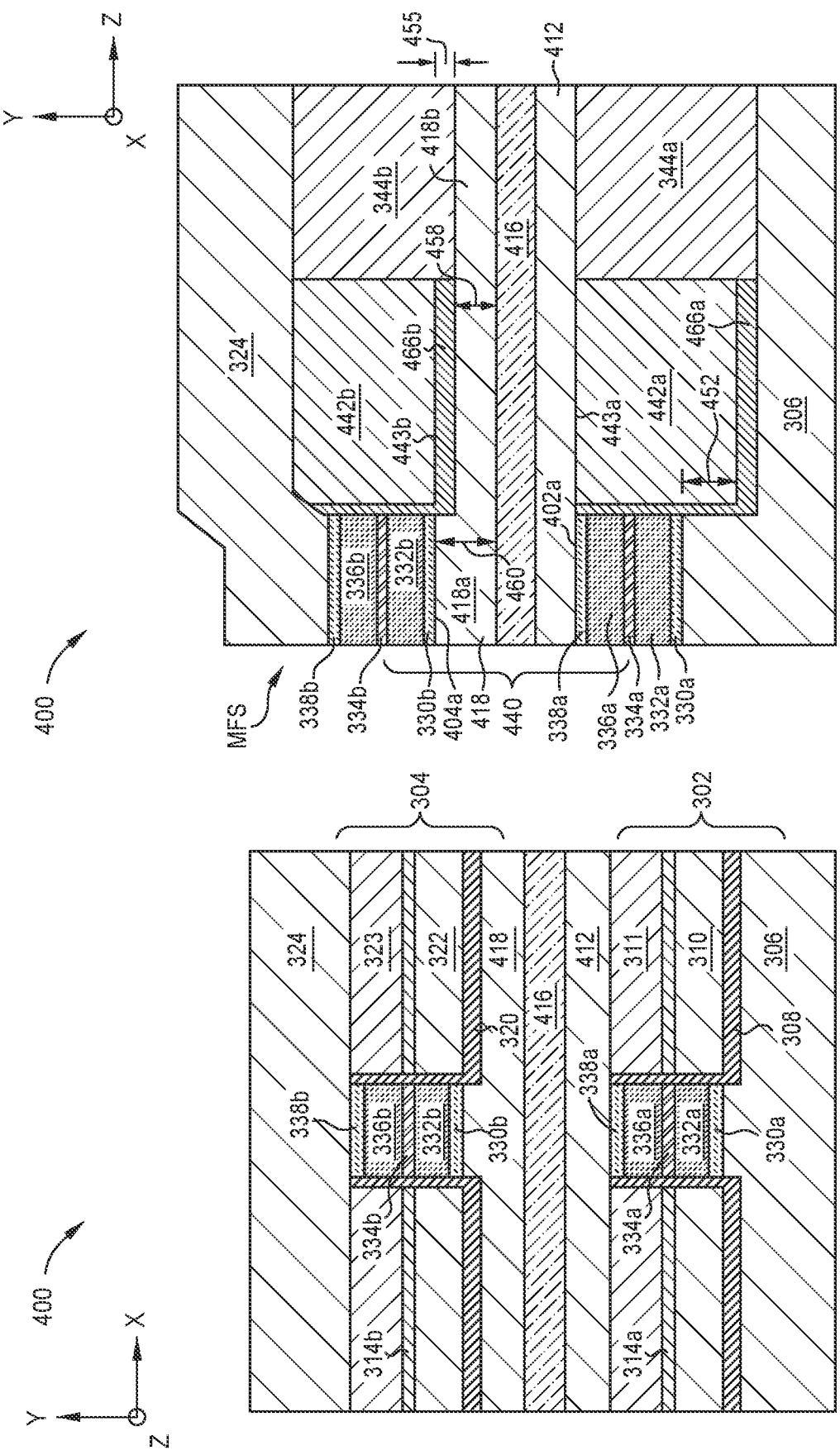
FIGS. 4A-4B illustrate various views of a DFL TDMR read head comprising two sensors or readers, according to various embodiments.

FIGS. 4A-4B illustrate various views of a DFL TDMR read head 400 comprising two sensors or readers 302, 304, according to one embodiment. FIG. 4A illustrates a MFS view of the DFL TDMR read head 400, and FIG. 4B illustrates a cross-sectional view of the DFL TDMR read head 400. The DFL TDMR read head 400 of FIGS. 4A-4B may be within the disk drive 100 of FIG. 1. The DFL TDMR read head 400 of FIGS. 4A-4B may be the magnetic read head 211 of FIG. 2. The DFL TDMR read head 400 is similar to the DFL TDMR read head 300 of FIGS. 3A-3B; however the first RHB structure 442a, the second insulation layer 466a, the first upper shield 412, the RSG 416, the second lower shield 418, the second RHB structure 442b, and the second insulation layer 466b vary.

Like the DFL TDMR read head 300 of FIGS. 3A-3B, the DFL TDMR read head 400 comprises the first sensor or reader 302 and the second sensor or reader 304. A first upper shield 412 is disposed over the first reader 302 and the second soft bias layer 311. As shown in FIG. 4B, a first surface 443a of the first RHB structure 442a disposed adjacent to the first upper shield 412 is substantially flush or aligned with a first surface 402a of the first reader 302. In other words, the first RHB structure 442a and the second insulating layer 466a are substantially flush or aligned with the top surface 402a of the cap layer 338a of the first sensor 302 in the z-direction. Similarly, a first surface 443b of the second RHB structure 442b is substantially flush or aligned with a first surface 404a of the second reader 304 in the z-direction. In other words, the second RHB structure 442b is substantially flush or aligned with the bottom surface 404a of the seed layer 330b of the second sensor 304 in the z-direction.

Rather than the first RHB structure 442a extending above the first reader 302 in the y-direction, the first RHB structure 442a is recessed further into the first lower shield 306 in the −y-direction than the first RHB structure 342a of the DFL TDMR read head 300 of FIGS. 3A-3B. The first RHB structure 442a of the read head 400 is recessed into the first lower shield 306 a distance 452 of about 15 nm to about 20 nm, which is greater than the distance 352 of FIGS. 3A-3B.

Because the first RHB structure 442a is substantially flush or aligned with the first reader 302, the first upper shield 412 and the RSG 416 of the DFL TDMR read head 400 each extends substantially linearly along the z-axis from the MFS into the read head 400 such that the first upper shield 412 and the RSG 416 are planar.

Additionally, because the first upper shield 412 and the RSG 416 of the DFL TDMR read head 400 are each planar or extend substantially linearly along the z-axis, the second lower shield 418 comprises only two portions. As shown in FIG. 4B, a first portion 418a of the second lower shield 418 disposed at the MFS adjacent to the second reader 304 has a first thickness 460 in the y-direction of about 20 nm to about 30 nm, and a second portion 418b of the second lower shield 418 disposed between the RSG 416 and the third insulation layer 344b has a second thickness 458 in the y-direction of greater than or equal to about 10 nm, such as about 15 nm to about 20 nm.

Comparing the second lower shield 418 of the read head 400 to the second lower shield 318 of the read head 300, the first thickness 360 of the first portion 318a of the second lower shield 318 of the read head 300 and the second thickness 358 of the second portion 318b of the second lower shield 318 of the read head 300 differ in thickness by about 15 nm to about 25 nm. However, the first portion 418a and the second portion 418b of the second lower shield 418 of the read head 400 only differ in thickness 455 by about 5 nm to about 10 nm. As such, the DTS 440 between the first sensor 302 and the second sensor 304 in the read head 400 is between about 75 nm to about 85 nm, which is less than the DTS 340 of the DFL TDMR read head 300 of FIGS. 3A-3B.

Because the first surface 443a of the first RHB structure 442a is aligned with the first surface 402a of the first sensor 302, and because the first surface 443b of the second RHB structure 442b is aligned with the first surface 404a of the second sensor 304, the first and second sensors or readers 302, 304 are physically asymmetric, where a bulk or majority of the first RHB structure 442a is disposed below (i.e., the −y-direction) the first sensor 302, and where a bulk or majority of the second RHB structure 442b is disposed above (i.e., the y-direction) the second sensor 304. As such, the DTS 440 between the first and second readers 302, 304 is decreased, enabling a larger fraction of the disk to be operated in TDMR mode hence improving the performance and reliability, both magnetically and electronically, of the read head 400.

Figure 5:
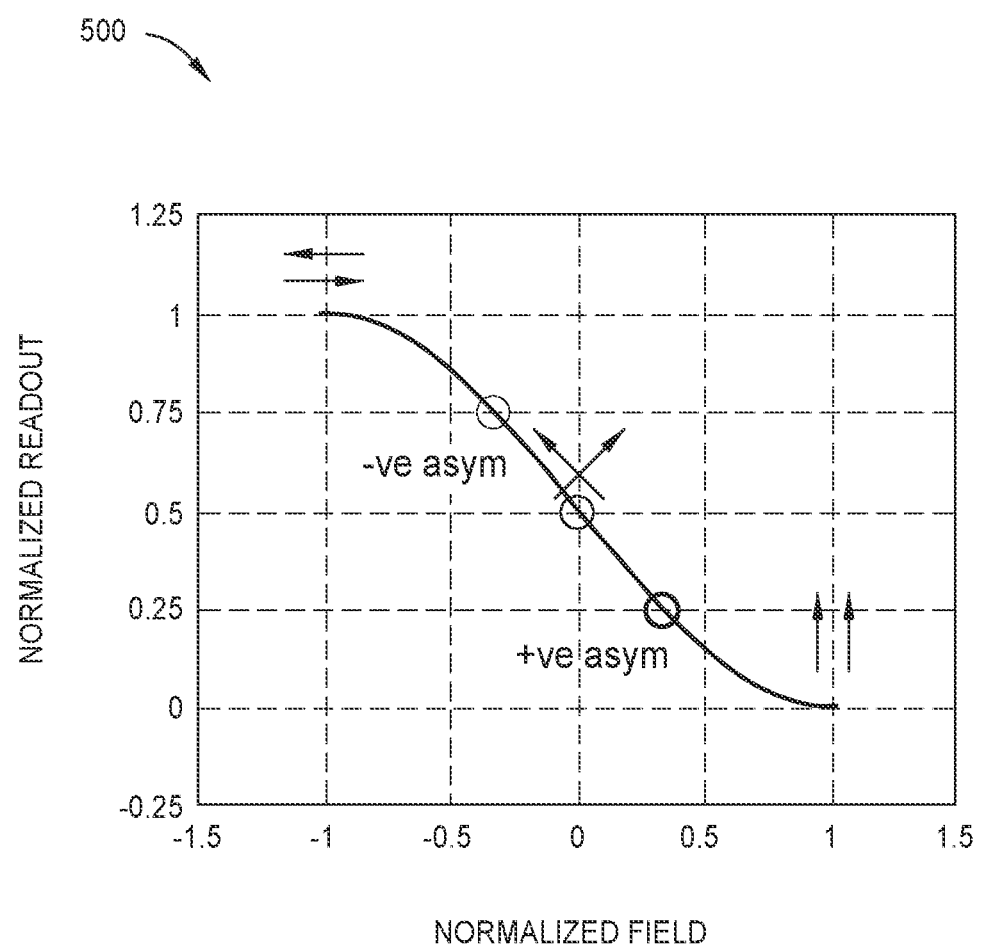
FIG. 5 illustrates a graph showing an ideal transfer curve for a DFL reader or sensor, according to one embodiment.

FIG. 5 illustrates a graph 500 showing an ideal transfer curve for a DFL reader or sensor 302 or 304 of the read head 400 of FIGS. 4A-4B, according to one embodiment. The y-axis of the graph 500 shows the normalized readout of the first and second sensors 302, 304 of the read head 400 of FIGS. 4A-4B, and the x-axis of the graph 500 shows the normalized field of the first and second sensors 302, 304 of the read head 400 of FIGS. 4A-4B.

Deeper over-milling of the first sensor or reader 302, hence lowering the position of the first RHB structure 442a, reveals a change in readout asymmetry of the first reader 302, where the net transverse bias field is reduced due to the fact that the first RHB structure 442a thickness is kept constant as the over-milling time is increased, causing the magnetic edge charge to become misaligned with respect to the two free layers 332a, 336a of the first reader 302. As shown in FIG. 5, the increased bias point corresponds to the change in readout asymmetry from a more positive transverse field (+ve) to a more negative transverse field (—ve), while this change is magnetically related to the change in relative orientation of the magnetic moments of the two free layers 332a, 336a of the first sensor 302 and of the two free layers 332b, 336b of the second sensor 304 (collectively referred to as the two free layers 332, 336).

The graph 500 further shows that a higher bias point or more −ve asymmetry is associated with more anti-parallel orientation of the magnetic moments of the two free layers (e.g., layer 332, 336) resulted from relatively stronger soft bias (e.g., of the soft bias layers 310, 322) (or weaker rear hard bias from the RHB structure 422a) while a lower bias point or more +ve asymmetry is related to more parallel orientation of the magnetic moments of the two free layers (e.g., layers 332, 336) driven by relatively stronger rear hard bias (e.g., of the RHB structures 442a, 442b) (or weaker soft bias). The bias point can be adjusted by performing soft bias and rear hard bias strength adjustments as desired by selecting magnetic materials with different magnetic moments and their combinations while maintaining the softness as soft bias or retentivity as rear hard bias.

Therefore, by increasing the over-milling time of the first sensor 302, hence the alignment of the first RHB structure 442a relative to the first sensor 302, and decreasing the over-milling time of the second sensor 304, hence the alignment of the second RHB structure 442b relative to the second sensor 304, the first and second readers 302, 304 are asymmetric, with the first surface 443a of the first RHB structure 442a being aligned with the first surface 402a of the first sensor 302, and the first surface 443b of the second RHB structure 442b being aligned with the first surface 404a of the second sensor 304. As such, the DTS 440 between the first and second readers 302, 304 is narrowed, enabling the read head 400 to operate in TDMR mode more effectively, and resulting in better performance in terms of areal density capacity (ADC) and higher reliability in terms of head instability (HI). Moreover, the performance and reliability, both magnetically and electronically, of the read head 400 are increased or improved.

In one embodiment, a read head comprises a first lower shield, a first upper shield over the first lower shield, a first sensor disposed at a media facing surface (MFS) between the first lower shield and the first upper shield, the first sensor comprising a first surface disposed adjacent to the first upper shield, a first rear hard bias (RHB) structure disposed adjacent to the first sensor between the first lower shield and the first upper shield, the first RHB structure being recessed from the MFS, wherein a first surface of the first RHB structure is substantially aligned with the first surface of the first sensor, a second lower shield disposed over the first upper shield, a second sensor disposed at the MFS between the second lower shield and the second upper shield, the second sensor comprising a first surface disposed adjacent to the second lower shield, and a second RHB structure disposed adjacent to the second sensor adjacent to the second lower shield, the second RHB structure being recessed from the MFS, wherein a first surface of the second RHB structure is substantially aligned with the first surface of the second sensor.

The first RHB structure is recessed into the first lower shield a distance of about 15 nm to about 20 nm. A down-track spacing between the first sensor and the second sensor is between about 75 nm to about 85 nm. The first upper shield extends substantially linearly from the MFS into the read head. The read head further comprises a first insulation layer surrounding a second surface and a third surface of the first RHB structure, a second insulation layer surrounding a second surface and a third surface of the second RHB structure, and a read separation gap disposed between the first upper shield and the second lower shield. A first surface of the first insulation layer disposed adjacent to the first upper shield is substantially aligned with the first surface of the first sensor and the first surface of the first RHB structure. The second lower shield comprises a first portion disposed at the MFS having a first thickness of about 20 nm to about 30 nm and a second portion disposed between the second RHB structure and the second insulation layer having a second thickness of about 15 nm to about 20 nm. A magnetic recording device comprises the read head.

In another embodiment, a read head comprises a first lower shield, a first sensor disposed at a media facing surface (MFS) on the first lower shield, a first rear hard bias (RHB) structure disposed adjacent to the first sensor, the first RHB structure being recessed from the MFS, a first upper shield over the first sensor and the first RHB structure, the first upper shield extending substantially linearly from the MFS into the read head, a read separation gap disposed over the first upper shield, the read separation gap extending substantially linearly from the MFS into the read head, a second lower shield disposed over the read separation gap, a second sensor disposed at the MFS on the first lower shield, a second RHB structure disposed adjacent to the second sensor, the second RHB structure being recessed from the MFS, and a second upper shield over the second sensor and the second RHB structure.

The first sensor comprises a first surface disposed adjacent to the first upper shield. The first RHB structure comprises a first surface disposed adjacent to the first upper shield. The first surface of the first sensor is substantially aligned with the first surface of the first RHB structure. The second sensor comprises a first surface disposed adjacent to the second lower shield. the second RHB structure comprises a first surface disposed adjacent to the second lower shield. The first surface of the second sensor is substantially aligned with the first surface of the second RHB structure. The second lower shield comprises a first portion disposed at the MFS having a first thickness and a second portion disposed between the second RHB structure and the read separation gap having a second thickness greater than the first thickness. The first thickness is about 20 nm to about 30 nm and the second thickness is about 15 nm to about 20 nm. The first sensor is over-milled a greater amount of time than the second sensor. The first RHB structure is disposed lower with respect to the first sensor than the second RHB structure is disposed with respect to the second sensor. The first sensor and the second sensor are physically asymmetric. A magnetic recording device comprises the read head.

In yet another embodiment, a read head comprises a first lower shield, a first upper shield over the first lower shield, a first dual free layer (DFL) sensor disposed at a media facing surface (MFS) between the first lower shield and the first upper shield, the first sensor comprising a first surface disposed adjacent to the first upper shield, a first rear hard bias (RHB) structure disposed adjacent to the first sensor between the first lower shield and the first upper shield, the first RHB structure being recessed from the MFS, wherein a first surface of the first RHB structure is substantially aligned with the first surface of the first sensor, a read separation gap disposed over the first upper shield, the read separation gap extending substantially linearly from the MFS into the read head, a second lower shield disposed over the read separation gap, a second DFL sensor disposed at the MFS on the first lower shield, and a second RHB structure disposed adjacent to the second sensor, the second RHB structure being recessed from the MFS, wherein a down-track spacing between the first sensor and the second sensor is between about 75 nm to about 85 nm.

The first RHB structure is recessed into the first lower shield a distance of about 15 nm to about 20 nm. The first sensor is over-milled a greater amount of time than the second sensor. The first RHB structure is disposed lower with respect to the first sensor than the second RHB structure is disposed with respect to the second sensor. The second DFL sensor comprises a first surface disposed adjacent to the second lower shield and the second RHB structure comprises a second surface disposed adjacent to the second lower shield. The second surface of the second RHB structure is substantially aligned with the first surface of the second DFL sensor. The read head further comprises a first anti-ferromagnetic coupling (AFC) soft bias shield disposed adjacent to the first DFL sensor at the MFS between the first lower shield and the first upper shield, and a second AFC soft bias shield disposed adjacent to the second DFL sensor at the MFS between the first lower shield and the first upper shield. The read head further comprises a first insulation layer disposed between the first DFL sensor and the first AFC soft bias shield at the MFS, and a second insulation layer disposed between the second DFL sensor and the second AFC soft bias shield at the MFS. A magnetic recording device comprises the read head.

While the foregoing is directed to embodiments of the present disclosure, other and further embodiments of the disclosure may be devised without departing from the basic scope thereof, and the scope thereof is determined by the claims that follow.

What is claimed is:

1. A read head, comprising:
a first lower shield;
a first upper shield over the first lower shield;
a first sensor disposed at a media facing surface (MFS) between the first lower shield and the first upper shield, the first sensor comprising a first surface disposed adjacent to the first upper shield;
a first rear hard bias (RHB) structure disposed adjacent to the first sensor between the first lower shield and the first upper shield, the first RHB structure being recessed from the MFS and recessed into the first lower shield, wherein a first surface of the first RHB structure is substantially aligned with the first surface of the first sensor;
a second lower shield disposed over the first upper shield;
a second sensor disposed at the MFS between the second lower shield and a second upper shield, the second sensor comprising a first surface disposed adjacent to the second lower shield; and
a second RHB structure disposed adjacent to the second sensor adjacent to the second lower shield, the second RHB structure being recessed from the MFS, wherein a first surface of the second RHB structure is substantially aligned with the first surface of the second sensor.

2. The read head of claim 1, wherein the first RHB structure is recessed into the first lower shield a distance of about 15 nm to about 20 nm.

3. The read head of claim 1, wherein a down-track spacing between the first sensor and the second sensor is between about 75 nm to about 85 nm.

4. The read head of claim 1, wherein the first upper shield extends substantially linearly from the MFS into the read head.

5. The read head of claim 1, further comprising:
a first insulation layer surrounding a second surface and a third surface of the first RHB structure;
a second insulation layer surrounding a second surface and the first surface of the second RHB structure; and
a read separation gap disposed between the first upper shield and the second lower shield.

6. The read head of claim 5, wherein a first surface of the first insulation layer disposed adjacent to the first upper shield is substantially aligned with the first surface of the first sensor and the first surface of the first RHB structure.

7. The read head of claim 5, wherein the second lower shield comprises a first portion disposed at the MFS having a first thickness of about 20 nm to about 30 nm and a second portion disposed between the second RHB structure and the second insulation layer having a second thickness of about 15 nm to about 20 nm.

8. A magnetic recording device comprising the read head of claim 1.

9. A read head, comprising:
a first lower shield;
a first sensor disposed at a media facing surface (MFS) on the first lower shield;
a first rear hard bias (RHB) structure disposed adjacent to the first sensor, the first RHB structure being recessed from the MFS and recessed into the first lower shield;
a first upper shield over the first sensor and the first RHB structure, the first upper shield extending substantially linearly from the MFS into the read head;
a read separation gap disposed over the first upper shield, the read separation gap extending substantially linearly from the MFS into the read head;
a second lower shield disposed over the read separation gap;
a second sensor disposed at the MFS on the second lower shield;
a second RHB structure disposed adjacent to the second sensor, the second RHB structure being recessed from the MFS; and
a second upper shield over the second sensor and the second RHB structure.

10. The read head of claim 9, wherein the first sensor comprises a first surface disposed adjacent to the first upper shield, wherein the first RHB structure comprises a first surface disposed adjacent to the first upper shield, and wherein the first surface of the first sensor is substantially aligned with the first surface of the first RHB structure.

11. The read head of claim 9, wherein the second sensor comprises a first surface disposed adjacent to the second lower shield, wherein the second RHB structure comprises a first surface disposed adjacent to the second lower shield, and wherein the first surface of the second sensor is substantially aligned with the first surface of the second RHB structure.

12. The read head of claim 9, wherein the first sensor is over-milled a greater amount of time than the second sensor, and wherein the first RHB structure is disposed lower with respect to the first sensor than the second RHB structure is disposed with respect to the second sensor.

13. The read head of claim 9, wherein the first sensor and the second sensor are physically asymmetric.

14. A magnetic recording device comprising the read head of claim 9.

15. A read head, comprising:
a first lower shield;
a first upper shield over the first lower shield;
a first dual free layer (DFL) sensor disposed at a media facing surface (MFS) between the first lower shield and the first upper shield, the first sensor comprising a first surface disposed adjacent to the first upper shield;

a first rear hard bias (RHB) structure disposed adjacent to the first sensor between the first lower shield and the first upper shield, the first RHB structure being recessed from the MFS and recessed into the first lower shield, wherein a first surface of the first RHB structure is substantially aligned with the first surface of the first sensor;

a read separation gap disposed over the first upper shield, the read separation gap extending substantially linearly from the MFS into the read head;

a second lower shield disposed over the read separation gap;

a second DFL sensor disposed at the MFS on the second lower shield; and a second RHB structure disposed adjacent to the second sensor, the second RHB structure being recessed from the MFS, wherein a down-track spacing between the first sensor and the second sensor is between about 75 nm to about 85 nm.

16. The read head of claim 15, wherein the second DFL sensor comprises a first surface disposed adjacent to the second lower shield and the second RHB structure comprises a second surface disposed adjacent to the second lower shield, and wherein the second surface of the second RHB structure is substantially aligned with the first surface of the second DFL sensor.

17. The read head of claim 15, further comprising:
a first anti-ferromagnetic coupling (AFC) soft bias shield disposed adjacent to the first DFL sensor at the MFS between the first lower shield and the first upper shield; and
a second AFC soft bias shield disposed adjacent to the second DFL sensor at the MFS between the second lower shield and the second upper shield.

18. The read head of claim 17, further comprising:
a first insulation layer disposed between the first DFL sensor and the first AFC soft bias shield at the MFS; and
a second insulation layer disposed between the second DFL sensor and the second AFC soft bias shield at the MFS.

19. A magnetic recording device comprising the read head of claim 15.

20. A read head, comprising:
a first lower shield;
a first sensor disposed at a media facing surface (MFS) on the first lower shield;
a first rear hard bias (RHB) structure disposed adjacent to the first sensor, the first RHB structure being recessed from the MFS;
a first upper shield over the first sensor and the first RHB structure, the first upper shield extending substantially linearly from the MFS into the read head;
a read separation gap disposed over the first upper shield, the read separation gap extending substantially linearly from the MFS into the read head;
a second lower shield disposed over the read separation gap;
a second sensor disposed at the MFS on the second lower shield;
a second RHB structure disposed adjacent to the second sensor, the second RHB structure being recessed from the MFS; and
a second upper shield over the second sensor and the second RHB structure, wherein the second lower shield comprises a first portion disposed at the MFS having a first thickness and a second portion disposed between the second RHB structure and the read separation gap having a second thickness less than the first thickness.

21. The read head of claim 20, wherein the first thickness is about 20 nm to about 30 nm and the second thickness is about 15 nm to about 20 nm.

22. A read head, comprising:
a first lower shield;
a first upper shield over the first lower shield;
a first dual free layer (DFL) sensor disposed at a media facing surface (MFS) between the first lower shield and the first upper shield, the first sensor comprising a first surface disposed adjacent to the first upper shield;
a first rear hard bias (RHB) structure disposed adjacent to the first sensor between the first lower shield and the first upper shield, the first RHB structure being recessed from the MFS, wherein a first surface of the first RHB structure is substantially aligned with the first surface of the first sensor;
a read separation gap disposed over the first upper shield, the read separation gap extending substantially linearly from the MFS into the read head;
a second lower shield disposed over the read separation gap;
a second DFL sensor disposed at the MFS on the second lower shield; and
a second RHB structure disposed adjacent to the second sensor, the second RHB structure being recessed from the MFS, wherein a down-track spacing between the first sensor and the second sensor is between about 75 nm to about 85 nm,
wherein:
the first RHB structure is recessed into the first lower shield a distance of about 15 nm to about 20 nm,
the first sensor is over-milled a greater amount of time than the second sensor, and
the first RHB structure is disposed lower with respect to the first sensor than the second RHB structure is disposed with respect to the second sensor.

* * * * *